(12) United States Patent
Hamsten

(10) Patent No.: US 7,306,087 B1
(45) Date of Patent: Dec. 11, 2007

(54) ARRANGEMENT AND A METHOD FOR CONTROLLING UNITS WITHIN A FLOW

(75) Inventor: Björn Hamsten, Göteborg (SE)

(73) Assignee: Flexlink Components AB (SE)

( * ) Notice: Subject to any disclaimer, the term of this patent is extended or adjusted under 35 U.S.C. 154(b) by 0 days.

(21) Appl. No.: 09/857,947

(22) PCT Filed: Sep. 12, 2000

(86) PCT No.: PCT/SE00/01758

§ 371 (c)(1),
(2), (4) Date: Sep. 17, 2001

(87) PCT Pub. No.: WO01/27008

PCT Pub. Date: Apr. 19, 2001

(30) Foreign Application Priority Data

Oct. 12, 1999 (SE) .................................... 9903691

(51) Int. Cl.
*B65G 47/68* (2006.01)
(52) U.S. Cl. .................. 198/429; 198/369.5; 198/436; 198/437; 198/460.1; 198/461.1
(58) Field of Classification Search ............ 198/459.1, 198/459.8, 460.1, 461.1, 461.2, 436, 442, 198/445, 451, 452, 369.5, 575–577, 427, 198/429, 437
See application file for complete search history.

(56) References Cited

U.S. PATENT DOCUMENTS

| | | | | |
|---|---|---|---|---|
| 1,741,616 A * | 12/1929 | Crady | .......................... | 193/36 |
| 1,753,036 A * | 4/1930 | Williamson et al. | ..... | 198/369.2 |
| 2,334,384 A * | 11/1943 | Cohen | ..................... | 198/369.5 |
| 3,667,622 A * | 6/1972 | Kamphues et al. | ......... | 214/6 A |
| 3,827,585 A * | 8/1974 | McWilliams | ................ | 414/398 |
| 3,908,333 A * | 9/1975 | Cavanna | ......................... | 53/51 |
| 4,779,715 A * | 10/1988 | Pazdernik | .................... | 198/436 |
| 5,186,306 A * | 2/1993 | Sjostrand | .................... | 198/442 |
| 5,188,210 A * | 2/1993 | Malow | ..................... | 198/369.5 |
| 5,318,165 A * | 6/1994 | Spatafora et al. | ........... | 198/433 |
| 5,353,916 A * | 10/1994 | Lehmann | ..................... | 198/461 |
| 5,439,094 A * | 8/1995 | Hakansson | ............... | 198/419.1 |
| 5,772,000 A * | 6/1998 | Serres | ..................... | 198/369.5 |
| 5,787,679 A * | 8/1998 | Lynch et al. | .................. | 53/202 |
| 5,906,265 A * | 5/1999 | Spatafora | ................. | 198/460.2 |
| 5,915,523 A * | 6/1999 | Spatafora | ................. | 198/461.3 |
| 5,944,165 A * | 8/1999 | Mannlein et al. | ........... | 198/442 |
| 5,971,134 A * | 10/1999 | Trefz et al. | .............. | 198/460.1 |

(Continued)

FOREIGN PATENT DOCUMENTS

EP       0429803  A1 *   10/1990

(Continued)

*Primary Examiner*—Douglas A Hess
(74) *Attorney, Agent, or Firm*—Lerner, David, Littenberg, Krumholz & Mentlik, LLP

(57) ABSTRACT

Apparatus for controlling units within a flow from at least one incoming feeder track into at least one outgoing feeder track is provided, including at least one shifting unit for controlled shifting of the flow into one or more selectable paths of the outgoing feeder track, wherein the shifting unit is provided with a speed controller for controlling the speeds of the respective units and separation of the units in the longitudinal direction of flow, the separation enabling the controlled shifting.

25 Claims, 4 Drawing Sheets

U.S. PATENT DOCUMENTS

| | | | |
|---|---|---|---|
| 5,988,356 A * | 11/1999 | Bonnet | 198/598 |
| 6,076,683 A * | 6/2000 | Okada et al. | 209/656 |
| 6,227,349 B1 * | 5/2001 | Finkowski et al. | 198/461.1 |
| 6,227,377 B1 * | 5/2001 | Bonnet | 209/650 |
| 6,347,697 B1 * | 2/2002 | Ouellette et al. | 198/358 |
| 6,691,858 B2 * | 2/2004 | Weber | 198/456 |

FOREIGN PATENT DOCUMENTS

| | | |
|---|---|---|
| EP | 0 429 803 A1 | 6/1991 |
| EP | -0 654 429 A1- | 5/1995 |
| WO | 97/05049 * | 2/1997 |

* cited by examiner

ARRANGEMENT AND A METHOD FOR CONTROLLING UNITS WITHIN A FLOW

FIELD OF THE INVENTION

The present invention relates to an arrangement for controlling units within a flow. More particularly, the invention is intended for use in connection with sorting, grouping and distribution of a flow of products in a manufacturing process or similar. The invention also relates to a method for such control.

BACKGROUND OF THE INVENTION

It is previously known to use various systems for transport and feeding of piece goods, such as the products of a manufacturing process, from one place to another. For example, such systems could include transport tracks and control devices intended for sorting, distribution and grouping of such products.

In the above-mentioned systems, transport devices are normally used for forwarding the products in a running flow at a certain speed. Such transport devices would then be arranged in accordance with the current application, and might for example be arranged for feeding a product from a first station comprising a manufacturing process to a second station comprising packaging of a number of such products.

For some types of product flow within a manufacturing process, very high flow rates may occur. As an example of such a flow, the manufacture of paper, to be used for example as toilet and kitchen roll paper, could be mentioned. In such a manufacturing process, initially very long paper rolls are manufactured, which are subsequently cut into a very large number of smaller rolls (i.e. the finished toilet and kitchen rolls) of a predetermined length. These finished rolls are then conveyed further to a station for grouping into larger units, e.g. packages of eight rolls, which are subsequently conveyed to a further station for packaging, e.g. into bales in turn comprising eight such packages.

In connection with the above process, a very high paper feeding speed will entail a further, substantial increase of the flow rate after the cutting into separate rolls. This flow rate increase could then cause a requirement for distributing the flow of finished rolls from a main flow into a larger number of subsequent flows. For example, one single manufacturing station could then be used for producing a flow of rolls being fed to five or ten subsequent stations for grouping and packaging.

In this connection it is previously known to distribute manufactured products from a main flow into several subsequent partial flows, i.e. into one of several different paths of a subsequent flow. Such known systems are however characterised by a relatively low flow rate, as the main flow has to be stopped during a short period of time, in which the product in the front rank of the main flow is guided into one of the subsequent partial flows. Only then can the main flow go on, whereupon the procedure will be repeated with the following product.

The problem may in some cases be solved by designing the manufacturing process in question with large buffers, or with dedicated extended conveyors. One problem with such solutions is, however, their space requirement. This in turn will be a disadvantage when producing for example in factories with a small floor area.

One object of the present invention is to provide an improved arrangement for the control of a flow of units, e.g. manufactured products, whereby the above-mentioned problems can be solved.

SUMMARY OF THE INVENTION

These and other objects have now been realized by the invention of apparatus for controlling units within a flow from at least one incoming feeder track into at least one outgoing feeder track, comprising at least one shifting unit for controlled shifting of the flow into one or more selectable paths of the outgoing feeder track, wherein the shifting unit is provided with means for controlling the speeds of the respective units, for separation of the units in the longitudinal direction of flow, the separation enabling the controlled shifting. In a preferred embodiment of the apparatus of the present invention, the means is arranged to control the speed of each unit, with a controlled acceleration of the unit up to a speed exceeding the speed of the flow within the incoming track, the separation resulting in a distance between two consecutive units, inside the shifting unit.

In accordance with another embodiment of the apparatus of the present invention, the apparatus is arranged to perform the shifting during a continuous flow of units, without arresting the flow.

In accordance with another embodiment of the apparatus of the present invention, the incoming track is arranged for feeding units at a variable speed, while the shifting unit is arranged for a constant speed, the means being arranged to control the shifting after a predetermined number of units.

In accordance with the present invention, a method has been devised for controlling units within a flow from at least one incoming feeder track into at least one outgoing feeder track, comprising controlled shifting of the flow into one or more selectable paths of the outgoing feeder track, the method comprising controlling the speeds of the respective units, for separation of the units in the longitudinal direction of flow, the shifting being performed between two consecutive units separated by a distance enabling the controlled shifting.

The present invention constitutes apparatus for controlling units within a flow from at least one incoming feeder track into at least one outgoing feeder track, comprising at least one shifting unit for controlled shifting of the flow into one or more selectable paths of the outgoing feeder track. In accordance with the present invention, the shifting unit is provided with means for controlling the speeds of the respective units, and for separation of the units in the longitudinal direction of flow, the separation enabling the controlled shifting.

Through the present invention, several advantages are achieved. Primarily it should be noted that the present invention allows high unit flow rates. Besides this, there will be no capacity losses during shifting, as a continuous flow is conveyed also during the shifts. Furthermore, a counting of the units is enabled, due to the above separation.

BRIEF DESCRIPTION OF THE DRAWINGS

The present invention will be described in further detail below, with reference to an example of a preferred embodiment and the enclosed drawings, wherein.

DETAILED DESCRIPTION

Figure 1:
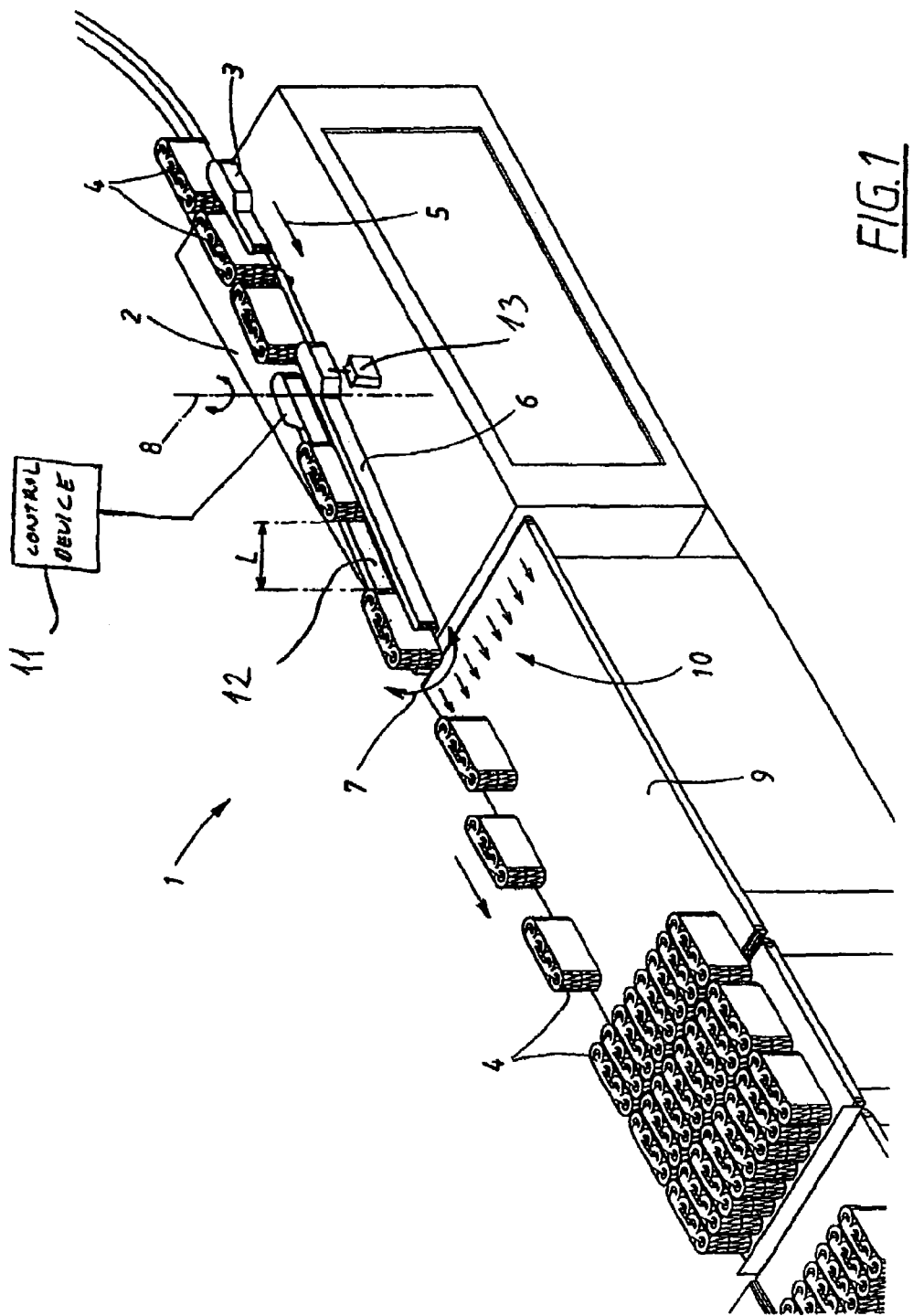
FIG. 1 is a side, perspective view of an arrangement according to the present invention.

FIG. 1 illustrates, schematically, a perspective view of an arrangement according to the present invention. According to a first, preferred embodiment, the invention is arranged as a station 1 in connection with a manufacturing process for manufacturing toilet paper rolls. The invention is however not limited to such an application, but may be used for a multitude of different product flows.

According to what is shown in FIG. 1, the station 1 comprises a base 2 supporting an incoming track 3 for feeding a flow of units, in the form of packages of toilet rolls 4, for example packaged with eight toilet rolls in each package 4.

The incoming track 3 comprises a transport device for controlling and feeding of the packages 4 in the direction indicated by the arrow 5 in FIG. 1. Preferably, the transport device may comprise endless conveyor belts on both sides of the packages 4, feeding the packages 4, by means of a motor drive, in the direction of said arrow 5 at a predetermined speed. The principle for controlling a product flow by means of conveyor belts and similar devices is as such previously known and will not be described in detail here.

The packages 4 are directed along the incoming feeder track 3 to a further unit in the form of a shifting unit 6, preferably in the form of a feeder track comprising a transport device which, like the incoming feeder path 3, is arranged for feeding units forward at a certain speed. However, the shifting unit 6 is arranged so as to be able to pivot in the horizontal plane, as indicated by a second arrow 7 in FIG. 1. For this purpose, the shifting unit 6 is pivotally arranged so as to allow pivoting about an imaginary axis 8, extending substantially in a vertical direction.

By means of the shifting unit 6, each package can be guided in the direction of an outgoing track, preferably likewise equipped with conveyor belts or similar, for transporting the packages 4 forward. More precisely, the shifting unit 6 is designed to guide each package 4 along a multitude of different, horizontally spaced courses or paths 10, depending on the currently set pivoting position of the shifting unit 6. In this manner, the packages 4 are guided to a predetermined position along a certain path 10 of the outgoing track 9. In the embodiment shown in FIG. 1, the outgoing track 9 consists of a conveyor belt used for grouping the packages 4 into groups of eight, which, in a subsequent (not illustrated) station may be packaged in a suitable manner, e.g. by plastic wrapping. This corresponds to the outgoing track 9 being defined with eight different paths 10, as indicated by arrows in FIG. 1.

A basic principle behind the invention is that the shifting unit 6 is arranged for a regulated speed control of the flow of packages 4, i.e. a speed control of the transport device included as an integral part of the shifting unit 6. Preferably, this speed control is performed as an acceleration of the packages 4, i.e. an increase of the speed of the individual package 4 in relation to the speed of the packages 4 along the incoming track 3. Due to this acceleration, a separation is created between two consecutive packages 4. This in turn will result in a certain distance L between two packages 4. The distance L corresponds to a certain time span, during which a shifting of the shifting unit 6 may be performed. In other words, the shifting unit 6 is then pivoted about its pivot axis 8, thereby guiding the subsequent package to another path 10 of the outgoing track 9.

The invention is thus used for continuous distribution of the packages 4 from an incoming flow into one or more outgoing flows. This is achieved by means of a controlled acceleration with a subsequent separation of the packages 4, in order to create, in this manner, a controlled distance L between the packages 4. Through the creation of this distance L, a shifting and distribution may be performed between a number of outgoing flows. Preferably, the packages 4 will be separated by a distance L corresponding to the length of one package 4.

For the control of the packages according to the invention, the shifting unit 6 is connected to a control unit (not shown), which is preferably computer-based and functioning to govern the procedure of speed control and package 4 shifting in the shifting unit 6, a/o in dependence of the speed of the incoming track 3 and the properties of the shifting unit 6 and the outgoing track 9, respectively. Thus, the invention could be said to include means for control of the speed regulation and of the shifting of the shifting unit, said means comprising a control unit connected to the shifting unit 6, conveyor means being controlled to a suitable speed, and means for the actual pivoting of the shifting unit 6 (preferably consisting of an electrical motor controlled by commands from the control unit so as to initiate the shifting at the appropriate points in time), all used for separating the units 4 in the longitudinal direction of the flow, enabling said shifting. The invention enables a control procedure at a very high average flow rate or speed. In particular, shifting can be performed while a continuous flow of packages 4 is passing through the shifting unit 6.

A further advantage of the invention is that the above-mentioned separation of packages 4 enables counting the number of packages 4 passing the shifting unit 6.

Figure 2:
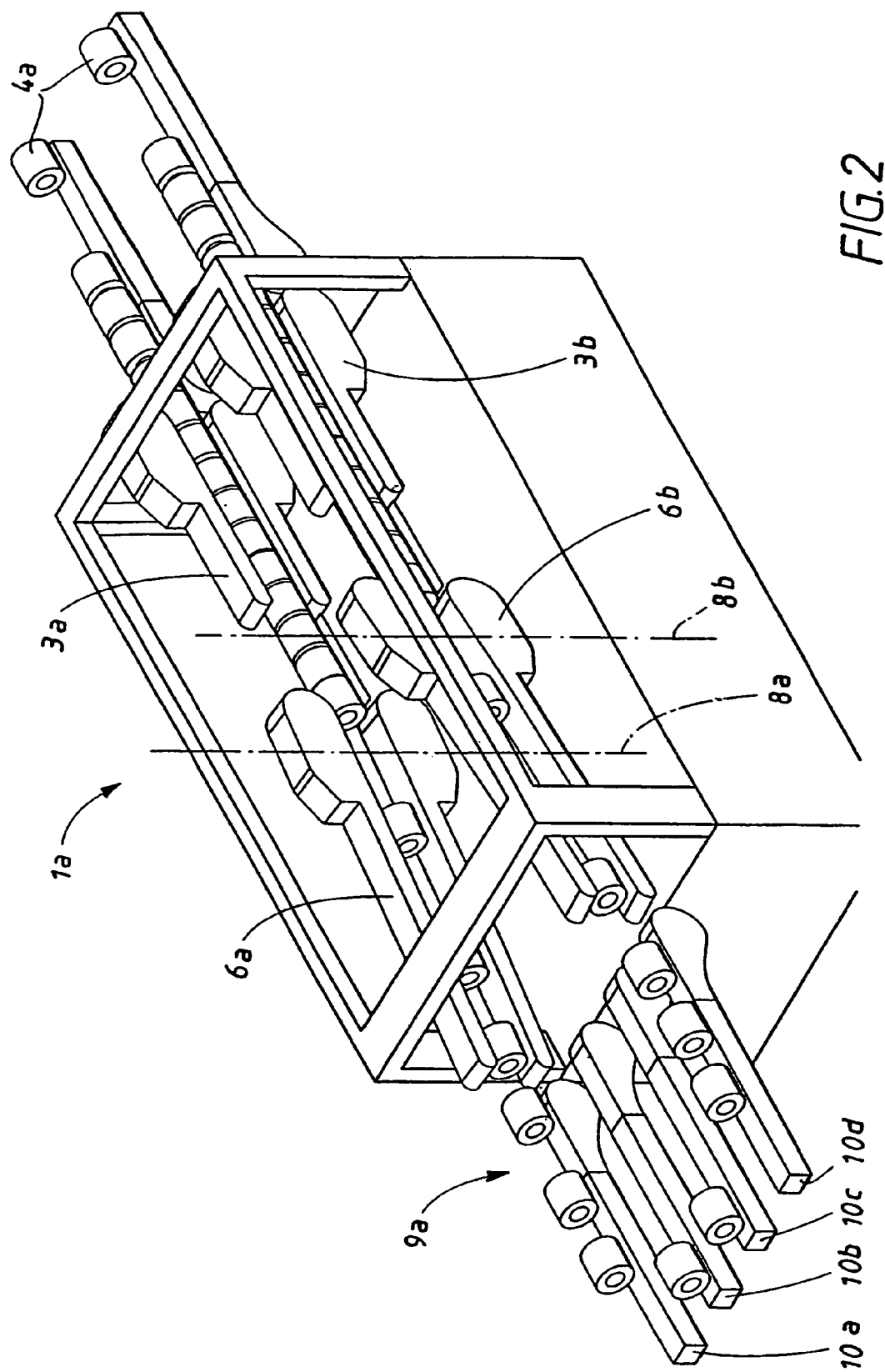
FIG. 2 is a side, perspective view of an arrangement according to an alternative embodiment of the present invention.

The invention can be used to control and feed the individual package 4 by means of transport devices acting transversally on the packages, as illustrated by FIG. 1. At a station 1a, in accordance with an alternative embodiment of the invention shown in FIG. 2, the invention can instead be utilised to control and feed units, e.g. in the form of toilet paper rolls 4a, by means of transport devices acting vertically. In the latter drawing, two incoming tracks 3a, 3b and two shifting units 6a, 6b are shown, functioning so as to control each toilet roll 4a by supporting it vertically. This station 1a further comprises an outgoing track 9a subdivided into four different paths 10a, 10b, 10c, 10d.

Through controlling the speed of the toilet rolls 4a within the shifting units 6a, 6b, a continuous shifting into one of the different paths 10a, 10b, 10c, 10d of the outgoing track 9a is enabled. To this end, each shifting unit is arranged for pivoting about an imaginary axis, 8a, 8b, respectively, extending substantially in the vertical direction.

Through each transport device in the respective shifting unit 6a, 6b, being arranged so as to contact the rolls 4a from above and from below, a very compact arrangement is provided, where the shifting units 6a, 6b can be pivoted to allow feeding into two adjacent paths (e.g. 10b and 10c) of the outgoing track 9a.

According to a further embodiment of the invention, an increased average speed is allowed of the flow of units through a station. This embodiment is described with reference to FIG. 3, which shows, in principle, a top view of a station 1c that could be designed according to what is shown in FIG. 1, but that is designed with an incoming track 3c arranged for feeding units 4c in a direction indicated by an arrow 5, i.e. towards the right in the figure. According to the embodiment, the incoming track 3c is arranged for a variable speed of the units 4c, preferably periodically variable. Furthermore, the shifting unit 6c is arranged with a constant speed, preferably higher than the highest momentary speed of the incoming track 3c. Through this arrangement, a feeding is achieved that allows a variable distance between the units 4c as they are fed along the shifting unit 6c. This variable distance can be used, according to the embodiment, to perform a shifting of the flow under transfer to an outgoing track 9c (e.g. between different paths 10e, 10f, 10g, 10h, 10i), in between two consecutive units (indicated with 4d and 4e, respectively, in FIG. 2), between which there is a distance of such magnitude that said shifting is possible. Thus, the shifting unit 6c is then shifted so as to direct the flow to another one of the paths 10e, 10f, 10g, 10h, 10i of the outgoing track 9c.

Figure 3:
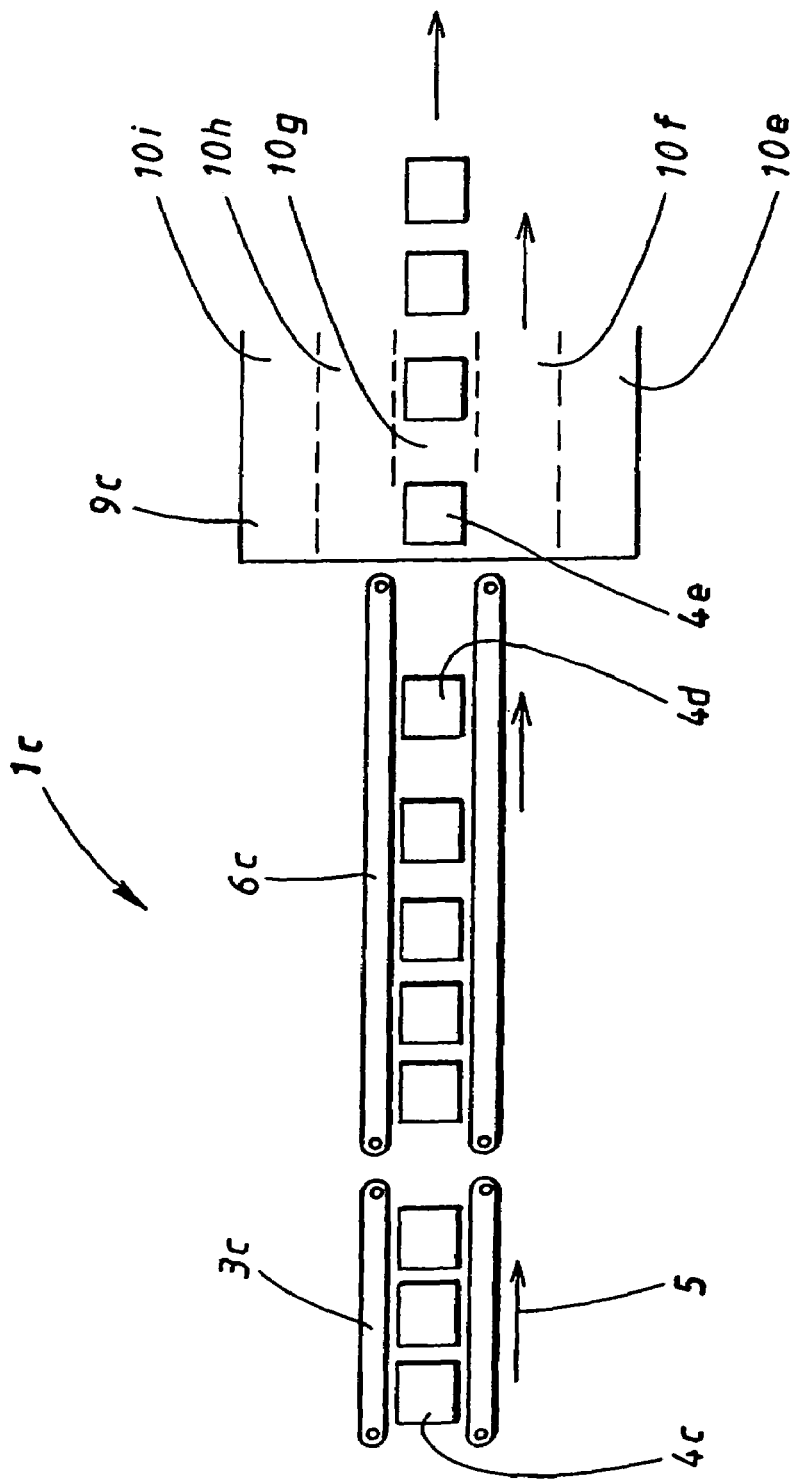
FIG. 3 is a further embodiment of the present invention.
Figure 4:
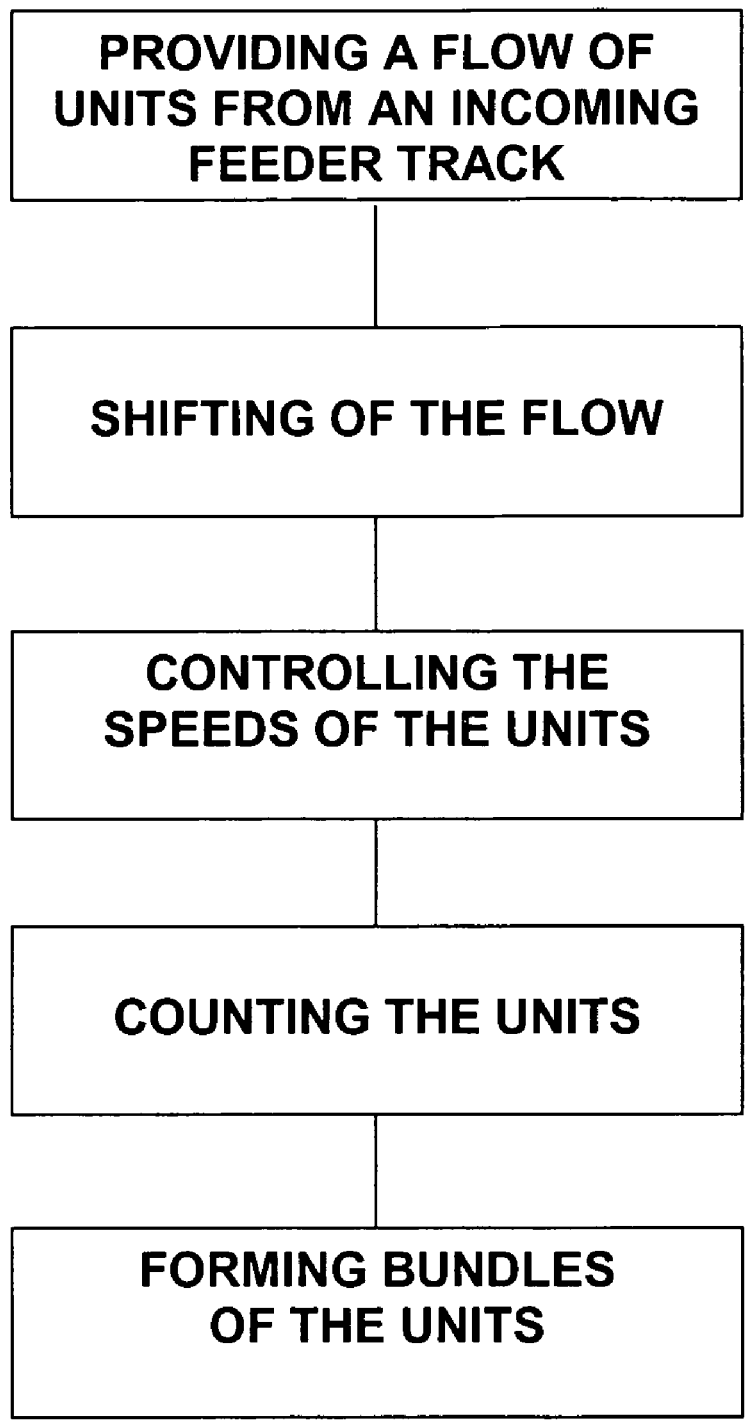
FIG. 4 is a flow chart depicting the method according to an embodiment of the present invention.

The embodiment according to FIG. 3 is suitable for those applications where very high flow rates (in the order of 300 products per minute or higher) are required. This embodiment is also suitable where the shifting of an entire group of units is wanted.

The invention can be utilised for grouping a flow of units within a process, that is directing the individual unit into a formation or group suitable for a certain subsequent treatment, e.g. packaging. The invention is also suitable for sorting a flow of units, i.e. guiding the individual unit into different paths of an outgoing track, depending on what type of unit is passing the shifting unit (e.g. a unit of a first material to a first path, a unit of a second material to a second path, etc.). The invention is also suitable for distributing units from e.g. one incoming flow into several outgoing flows.

The invention will not be limited to the embodiments described above, but can be varied within the scope of the appended claims. For example, the invention is not limited to controlling a flow along a substantially horizontal plane between different paths of an outgoing track, but may also be utilised for controlling units vertically, i.e. between different paths arranged at different vertical levels.

The invention can be used with flows of several different types of units besides rolls of paper, as described above. The invention also allows very quick shifting of the shifting unit between different paths of an outgoing track. More precisely, shifting can be performed within about 0.1 second, allowing a flow rate in the order of 300 units per minute. The invention may however be dimensioned for a different shifting time. The embodiment illustrated in FIG. 3 will allow an average flow rate in excess of 300 units per minute.

The invention can be used for one or several incoming flows distributed into a larger or smaller number of outgoing flows. The invention may thus be applied onto a flow running in the reverse direction, compared to what is shown e.g. in FIG. 1, that is, for merging various partial flows into one single, larger flow. An identical number of incoming and outgoing flows is also conceivable, if the invention is used for the sorting of units.

The incoming track could be comprised of a transport track where the units are transported at a certain speed, or could alternatively be comprised of a buffer with substantially stationary units, which are successively fed into the shifting unit.

The transport devices used within the shifting unit and, if applicable, also in the incoming and the outgoing track, could be of the endless conveyor belt type, made of rubber or similar material. Alternatively, the transport devices may consist of band conveyors, belt conveyors or chain conveyors.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for controlling units within a continuous flow, said apparatus comprising:
    an incoming feeder track, said incoming feeder track including a first transport device for controlling and feeding said units at a predetermined variable or constant speed;
    an outgoing feeder track;
    at least one shifting device for controlled shifting of said flow from said incoming feeder track into a plurality of selectable paths of said outgoing feeder track, said at least one shifting device being pivotally arranged about a pivoting axis and including a second transport device arranged for feeding and guiding said units towards said outgoing feeder track; and,
    a control device capable of controlling speeds of each said unit and of determining shifting of said shifting device, said control device being arranged for speed control of said shifting device so as to accelerate said units when said units enter the second transport device of said shifting device, thereby providing separation of said units with respect to one another in a longitudinal direction of flow while each unit is guided to a selected path of said outgoing feeder track, said separation allowing for said controlled shifting without arresting said continuous flow and for counting of said units passing through said shifting device.

2. The apparatus according to claim 1, wherein said control device operates in dependence of the speed of each said unit from said incoming feeder track, said shifting device and said outgoing feeder track.

3. The apparatus according to claim 1, further comprising means for pivoting said shifting device.

4. The apparatus according to claim 3, wherein said means for pivoting said shifting device is a motor controlled by commands from said control device.

5. The apparatus according to claim 1, wherein the control device further comprises means for varying the speeds of each said unit.

6. The apparatus according to claim 1, wherein each said unit is accelerated when entering said shifting device to a speed exceeding the speed of said flow from said incoming feeder track.

7. The apparatus according to claim 1, wherein said incoming feeder track is arranged for feeding units at a variable speed, while said shifting device is arranged for a constant speed.

8. The apparatus according to claim 1, wherein said plurality of selectable paths are horizontally spaced.

9. The apparatus according to claim 1, wherein said selectable paths are substantially parallel to one another.

10. The apparatus according to claim 1, wherein said speed control is arranged to accelerate said units so as to provide a separation of at least a minimum distance between two consecutive units which allows said controlled shifting into said selectable paths.

11. The apparatus according to claim 10, wherein the shifting unit is arranged so that said minimum distance between two consecutive units is maintained at a position where said units leave said shifting unit and enter said outgoing feeder track.

12. The apparatus according to claim 1, wherein the second transport device acts transversally or vertically upon said units while feeding and guiding said units.

13. The apparatus according to claim 1, wherein the shifting unit is pivotally arranged about an imaginary axis extending generally in the vertical direction.

14. The apparatus according to claim 1, wherein said shifting unit is arranged for guiding at least two units simultaneously.

15. An apparatus for controlling units within a continuous flow, said apparatus comprising:
   an incoming feeder track, said incoming feeder track including a first transport device for controlling and feeding said units at a predetermined variable or constant speed;
   an outgoing feeder track;
   at least one shifting device for controlled shifting of said flow from said incoming feeder track into a plurality of selectable paths of said outgoing feeder track said at least one shifting device being pivotally arranged about a pivoting axis and including a second transport device arranged for feeding and guiding said units towards said outgoing feeder track;
   means for pivoting said shifting device;
   means for controlling speeds of each said unit in said shifting device; and,
   a control device capable of controlling said means for pivoting said shifting device, and said means for controlling the speeds of each said unit, wherein said control device operates in dependence of the speed of each said unit from said incoming feeder track, said shifting device, and said outgoing feeder track,
   said control device being arranged for speed control of said means for controlling speeds of each said unit so as to accelerate said units when said units enter the second transport device of said shifting device in order to allow for separation of said units with respect to one another in a longitudinal direction of flow while each unit is guided to a selected path of said outgoing feeder track, said separation allowing for said controlled shifting without arresting said continuous flow and for counting of said units passing through said shifting device.

16. The apparatus according to claim 15, wherein said means for pivoting said shifting device is a motor controlled by commands from said control device.

17. The apparatus according to claim 15, wherein each said unit is accelerated when entering said shifting device to a speed exceeding the speed of said flow from said incoming feeder track.

18. The apparatus according to claim 15, wherein said incoming feeder track is arranged for feeding units at a variable speed, while said shifting device is arranged for a constant speed.

19. The apparatus according to claim 15, wherein said plurality of selectable paths are horizontally spaced.

20. The apparatus according to claim 15, wherein said selectable paths are substantially parallel to one another.

21. The apparatus according to claim 15, wherein said speed control is arranged to accelerate said units so as to provide a separation of at least a minimum distance between two consecutive units which allows said controlled shifting into said selectable paths.

22. The apparatus according to claim 21 wherein the shifting unit is arranged so that said minimum distance between two consecutive units is maintained at a position where said units leave said shifting unit and enter said outgoing feeder track.

23. The apparatus according to claim 15 wherein the second transport device acts transversally or vertically upon said units while feeding and guiding said units.

24. The apparatus according to claim 15 wherein the shifting unit is pivotally arranged about an imaginary axis extending generally in the vertical direction.

25. The apparatus according to claim 15, wherein said shifting unit is arranged for guiding at least two units simultaneously.

* * * * *

UNITED STATES PATENT AND TRADEMARK OFFICE
CERTIFICATE OF CORRECTION

PATENT NO. : 7,306,087 B1 Page 1 of 1
APPLICATION NO. : 09/857947
DATED : December 11, 2007
INVENTOR(S) : Bjorn Hamsten It is certified that error appears in the above-identified patent and that said Letters Patent is hereby corrected as shown below:

Column 4, line 14, "unit (not shown)," should read --unit 11,--.
Column 4, line 22, "unit connected" should read --unit 11 connected--.
Column 4, line 23, "means being" should read --means 12 being--.
Column 4, line 25, "motor controlled" should read --motor 13 controlled--.
Column 4, line 26, "unit so" should read --unit 11 so--.

Signed and Sealed this

Sixteenth Day of December, 2008

JON W. DUDAS
*Director of the United States Patent and Trademark Office*